US006944390B1

(12) United States Patent
Eubanks

(10) Patent No.: US 6,944,390 B1
(45) Date of Patent: Sep. 13, 2005

(54) METHOD AND APPARATUS FOR SIGNAL PROCESSING AND RECORDING MEDIUM

(75) Inventor: Curtis Eubanks, Tokyo (JP)

(73) Assignee: Sony Corporation, Tokyo (JP)

(*) Notice: Subject to any disclaimer, the term of this patent is extended or adjusted under 35 U.S.C. 154(b) by 1008 days.

(21) Appl. No.: 09/661,878

(22) Filed: Sep. 14, 2000

(30) Foreign Application Priority Data

Sep. 14, 1999 (JP) .................................. 11-261262

(51) Int. Cl.[7] .............................................. H04N 5/93
(52) U.S. Cl. ........................... 386/52; 386/95; 386/109
(58) Field of Search ............................... 386/52, 55, 95, 386/131, 46, 109–112; H04N 5/93

(56) References Cited

U.S. PATENT DOCUMENTS

| 6,215,746 | B1 * | 4/2001 | Ando et al. .................... 386/95 |
| 6,262,723 | B1 * | 7/2001 | Matsuzawa et al. ......... 715/723 |
| 6,370,198 | B1 * | 4/2002 | Washino ................. 375/240.26 |
| 6,516,135 | B1 * | 2/2003 | Higuchi et al. ............. 386/131 |
| 6,600,869 | B1 * | 7/2003 | Chen et al. .................... 386/52 |

* cited by examiner

Primary Examiner—Vincent Boccio
(74) Attorney, Agent, or Firm—Frommer Lawrence & Haug LLP; William S. Frommer; Thomas F. Presson

(57) ABSTRACT

In processing video signals, editing of video signals is to be performed speedily without deteriorating the video signals. In a state S01, an input command is recorded in an editing list. In a state S02, the editing list is split into plural editing segments. In a state S03, processing consistent with the form of the video signals is performed on one editing segment and, in a state S04, the results of processing of one editing segment is sent out.

8 Claims, 12 Drawing Sheets

```
class EditList {
    int     startTime;      /* START TIME (ABSOLUTE FRAME)          */
    int     duration;       /* ENTIRE VIDEO TIME(FRAME)             */
    int     aClipCounty;    /* NUMBER OF CLIPS IN TRACK A           */
    AVClip  aSources[];     /* CLIP DATA OF EACH CLIP IN TRACK A    */
    int     bClipCount;     /* NUMBER OF CLIPS IN TRACK A           */
    AVClip  bSources[];     /* CLIP DATA OF EACH CLIP IN TRACK B    */
    int     effectsCount;   /* NUMBER OF EFFECTS IN EFFECT TRACK    */
    Effect  effects[];      /* EFFECT DATA                          */
};
```

FIG.3A

```
class AVClip {
    int     startTime;      /* START TIME (ABSOLUTE FRAME)              */
    int     duration;       /* NUMBER OF FRAMES IN THIS CLIP            */
    int     mediaType[];    /* VIDEO COMPRESSION FORMAT (STANDARD)      */
    char    filename[];     /* FILENAME OF THIS INPUT STREAM            */
    int     frameOffset;    /* FILE START FRAME                         */
};
```

FIG.3B

```
class Effect {
    int     startTime;      /* START TIME (ABSOLUTE FRAME)                      */
    int     duration;       /* NUMBER OF FRAMES IN THIS EFFECT                  */
    int     effectType;     /* STANDARD FORMAT EFFECT TYPE (E.G. WIPE)          */
    void    *effectParams;  /* VARIABLE EFFECT PARAMETERS (START %,             */
                            /* END OP; E.G. DIRECTION)                          */
};
```

FIG.3C

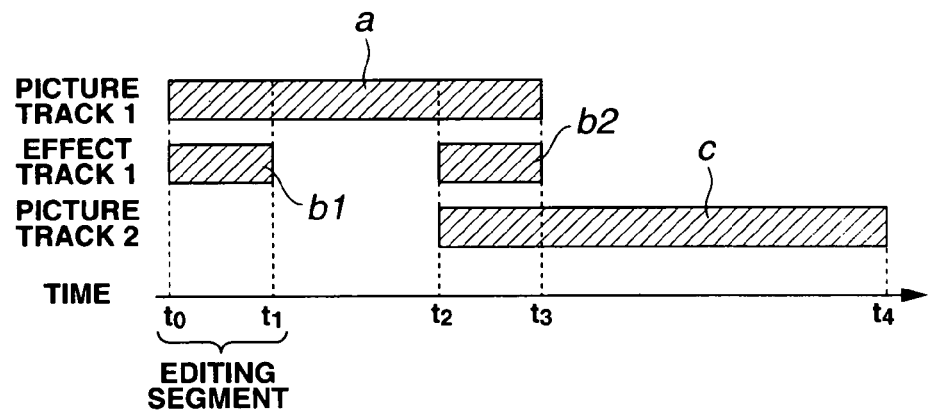

FIG.5A

| EDITING SEGMENTS 1 ||
|---|---|
| START | $t_0$ |
| PERIOD | $t_1 \sim t_0$ |
| VIDEO 1 | a |
| VIDEO 2 | ⌀ |
| EFFECT | b1 |

FIG.5B

| EDITING SEGMENTS 2 ||
|---|---|
| START | $t_1$ |
| PERIOD | $t_2 \sim t_1$ |
| VIDEO 1 | a |
| VIDEO 2 | ⌀ |
| EFFECT | ⌀ |

FIG.5C

| EDITING SEGMENTS 3 ||
|---|---|
| START | $t_2$ |
| PERIOD | $t_3 \sim t_2$ |
| VIDEO 1 | a |
| VIDEO 2 | c |
| EFFECT | b2 |

FIG.5D

| EDITING SEGMENTS 4 ||
|---|---|
| START | $t_3$ |
| PERIOD | $t_4 \sim t_3$ |
| VIDEO 1 | ⌀ |
| VIDEO 2 | c |
| EFFECT | ⌀ |

```
class VideoModel {
int format;   /* STANDARD FORMAT IDENTIFIER */
int class;    /* STANDARD CLASS IDENTIFIER */

// DECODE FRAME INTO RGB
char *ConvertToBaseband(AVSource *pSource, int frame);

// DECODE FRAME TO FORMAT (TO E.G. DCT LEVEL)
void *ConvertToClass(AVSource* pSource);

// TRANSFORM FROM FORMAT CLASS(E.G. DCT) TO THIS FORMAT
void *ConvertFromClass(Void* pClassData);

// APPLY TRANSITION EFFECT USING SPECIFIED KNOWLEDGE OF THIS FORMAT
int ApplyEffect(AVSource *pInputA, AVSource *pInputB,
        AVSource *pOutputC, Effect *pEffect);
};
```

FIG.7

```
#define FourCC(a,b,c,d)      ((a<<24) | (b<<16) | (c<<8) | (d))

#define FORMAT/DV            FourCC('D','V','C','S')
#define FORMAT_MJPG          FourCC('M','J','P','G')

#define CLASS_IDCT           FourCC('I','D','C','T')
```

METHOD AND APPARATUS FOR SIGNAL PROCESSING AND RECORDING MEDIUM

BACKGROUND OF THE INVENTION

1. Field of the Invention

This invention relates to a method and a device for processing video signals and to a recording medium on which is recorded a program for processing the video signals.

2. Description of Related Art

A picture editing device, termed a non-linear video editing device, is already put on the market. This non-linear video editing device, provided with a disc-shaped recording medium, such as a hard disc, as a temporary recording medium used in editing, is randomly accessible, thus enabling non-sequential non-linear editing. In such non-linear video editing device, a desired image material may be read out promptly, whilst the image material can be inserted and removed easily to or from a continuous image material.

However, in the conventional non-linear video editing device, there are imposed limitations such that a user is compelled to use a sole format of image data, or such that, even though the user is allowed to use plural formats, image data has to be transformed to common format data in case of performing image processing of specified effects or total effects, such as, for example, transition effect.

In the former case, if the user is compelled to use a sole format, the user is unable to select the format freely, thus imposing a load on the user.

In the latter case, the processing of transforming the format to a common format is in need of significant overhead in processing or deteriorates the video image quality.

Especially, an image format, which is based on the discrete cosine transform (DCT), such as so-called MPEG (Moving Picture Experts Group), so-called JPEG (Joint Photographic Coding Experts Group), so-called H.261 or the so-called DV (Digital Video), uses quantization of DCT coefficients in a portion of the compression processing.

In an ordinary technique of the general-purpose editor, th image format is restored into pixel (picture element) representation and picture processing is executed in a spatial area to compress the picture again by way of re-encoding. However, re-quantization of DCT coefficients in encoding and rounding to integers lead to image distortion, which keeps on to be accumulated from generation to generation.

SUMMARY OF THE INVENTION

It is therefore an object of the present invention to provide a method and a device for signal processing, in which video signals can be edited speedily without deteriorating the picture quality, and a recording medium on which is recorded a program for such editing.

In one aspect, the present invention provides a signal processing device including form specifying means for specifying the forms of input video signals, inputting means fed with an editing operation for the input video signals, a plurality of editing processing means, associated with the forms, converting means for converting the input video signals, edited by the editing processing means, into an output stream, and control means for managing control to edit the input video signals by the editing processing means associated with the forms in accordance with the forms of the input video signals specified by the form specifying means. The editing processing means edits the input video signals in accordance with an editing operation fed as an input to the inputting means.

In another aspect, the present invention provides a signal processing method including specifying the forms of input video signals, receiving an editing operation for the input video signals, editing the input video signals in accordance with an input editing operation, converting the edited input video signals into an output stream and managing control to edit the input video signals associated with the forms depending on the form of the input video signals as specified.

In yet another aspect, the present invention provides a recording medium having a program for processing video signals recorded thereon, in which the program includes specifying the forms of input video signals, receiving an editing operation for the input video signals, editing the input video signals in accordance with an input editing operation, converting the edited input video signals into an output stream and managing control to edit the input video signals associated with the forms depending on the form of the input video signals as specified.

According to the present invention, compressed video signals of variable formats can be edited without expanding compressed video signals. Thus, according to the present invention, the video signals can be edited speedily without deteriorating the signal quality.

BRIEF DESCRIPTION OF THE DRAWINGS

FIG. 3 shows a structure of an editing list, an AV clip and an effect.

FIG. 4 shows a timing diagram of simplified video editing.

FIG. 5 shows an editing segment which has split the simplified editing list.

FIG. 7 shows a glass video module.

DESCRIPTION OF THE PREFERRED EMBODIMENTS

Figure 1:
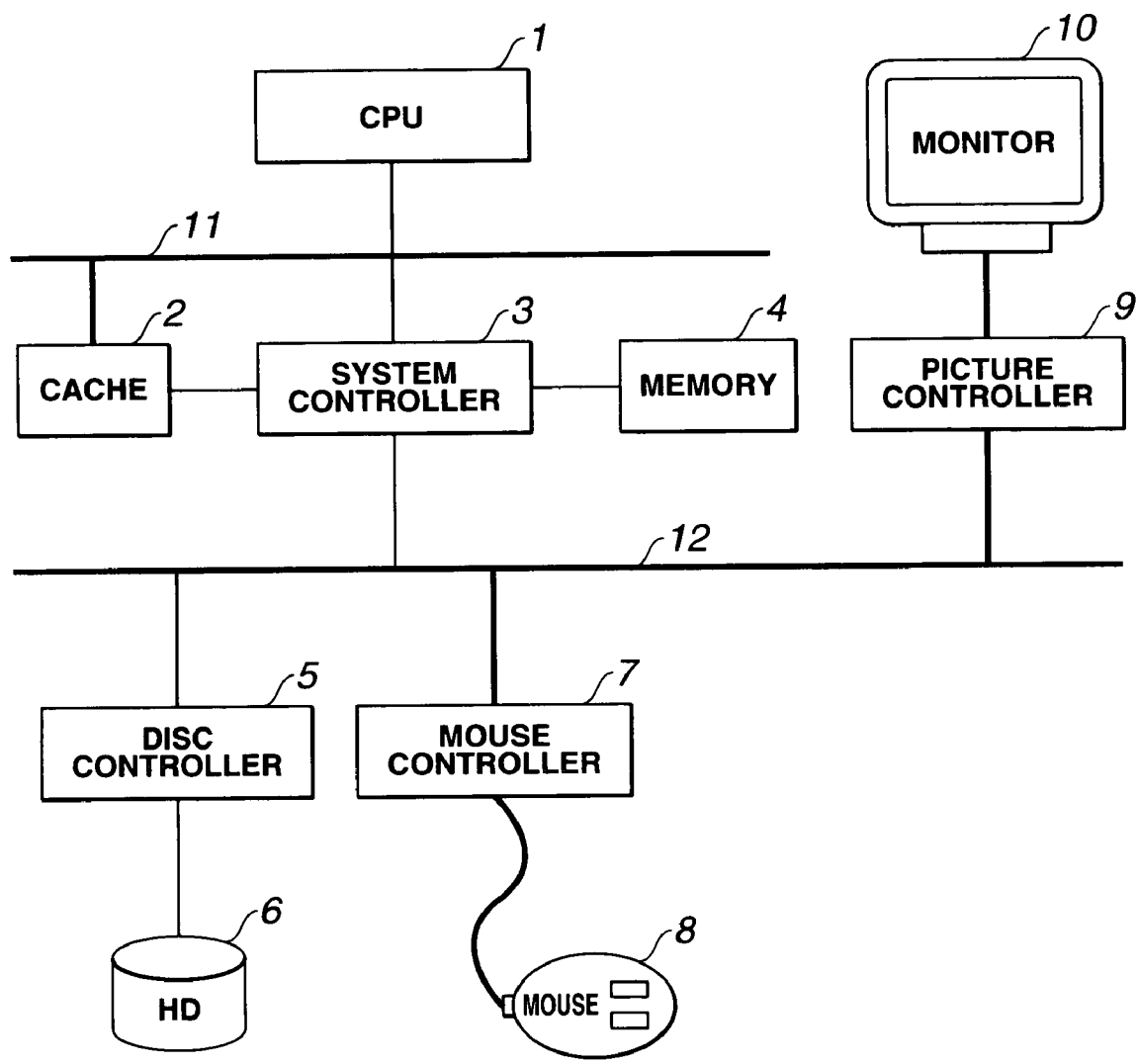
FIG. 1 is a schematic block diagram showing an overall structure of a picture editing device.

Referring to the drawings, preferred embodiments of the present invention will be explained in detail. First, the structure of a picture editing device embodying the present invention is explained with reference to FIG. 1. The picture editing device of the present embodiment is able to handle formats of plural picture data and can be extended depending on the formats.

This picture editing device is provided with specified formats or format classes, specifically, plural video format modules for coping with highly optimized processing; for DCT-based processing in the frequency domain and in the compressed domain, such as MPEG. In this picture editing device, many picture processing operations can be performed more speedily with less deterioration by employing processing techniques in the compressed domain and in the frequency domain.

Referring to FIG. 1, a preferred hardware configuration of the picture editing device of the present embodiment includes a CPU 1 for controlling the entire picture editing device, a cache 2, as a high-speed memory, a system controller 3, for controlling the system, and a memory 4 for storing data.

The CPU 1 controls the picture editing device in its entirety, while executing various processing operations. The cache 2 is a high-speed memory and has frequently accessed portions of the memory 4, thereby increasing the accessing speed to the memory 4. The system controller 3 is used for controlling the resources of the system including the memory 4.

Data is stored in the memory 4, from or to which the data can be read out or written based on commands from the CPU 1 and the system controller 3. In the present embodiment, a DRAM is used as the memory 4.

The CPU 1, cache 2, system controller 3 and the memory 4 are interconencted over an internal bus 11, which operates as high-speed communication means between these components.

The picture editing device also includes a hard disc 6, as a large capacity recording device, a disc controller 5, for controlling the hard disc 6, a mouse 8, as a pointing device, a mouse controller 7, for controlling the mouse 8, a monitor 10 for displaying the text and the picture, and a picture controller 9 for controlling the display on the monitor 10.

The hard disc 6 is a large-capacity storage device. The display device 6 controls the data writing and the data readout in or from a specified area of the hard disc 6.

In the picture editing device, picture data can be random-accessed, using the hard disc 6, thus enabling non-sequential non-linear editing for picture data.

The mouse 8 is a pointing device which gives position data based on its movement. Moreover, data can also be fed by pushing a button. The CPU 1 displays a cursor on the monitor 10, based on data sent from the mouse 8, to perform interactive control with the user.

The monitor 10 displays an image and is comprised of, for example, a CRT. The monitor 10 displays chronologically changed images based on states created by the CPU 1. The picture controller 9 processes a drawing command or other commands from the CPU 1 to transform the received command to send it to the monitor 10.

The system controller 3, disc controller 5, mouse controller 7 and the picture controller 9 are interconnected over an external bus 12. The external bus 12 operates as communication means distinct from the internal bus 11. The CPU 1 accesses the resources on the external bus 12 through the system controller 3.

The present embodiment is a extensible non-linear picture editing device. This picture editing device receives optional formats known to the picture editing device as input picture data and is responsive to variable editing commands to generate output stream of images.

This picture editing device has dynamically extensible sets of modules. These modules can be processed to optimize the speed and/or picture quality with respect to the specified data formats or to specified data format classes. These modules use a technique derived from the features inherent to the specified formats or format classes. This technique includes processing technique in a frequency domain and in a compression domain in a non-limiting fashion.

The format module is in agreement with the standard video editing API. The module may be added, deleted or substituted with respect to the system.

If the video module is unable to perform processing optimum for data, the picture editing device transforms video data into data of a common format.

If a module processes the video data in a certain class in the data format, the data can be transformed into an intermediate form.

It will be understood that execution of the video processing in the inherent format of the picture data is effective for other formats such as formats which are based on wavelet or fractal.

Since this picture editing device is extensible, these formats can be utilized by adding corresponding video modules to the system when such new development should present itself.

In the picture editing device, non-linear picture processing is performed on picture data accumulated on the hard disc 6. This non-linear editing is explained with reference to the status transition diagram of FIG. 2.

The non-linear picture processing is realized on an operating system executed on the hardware of the picture editing device. This operating system furnishes a media library in turn furnishing the operation of the system level on the file system and the file operation, a graphical user interfacing operation including the file selection, window and event processing and standard processing for the picture processing file.

The media library has to be able to open and read out a picture file, while it has to write data in it, close and identify it.

Figure 2:
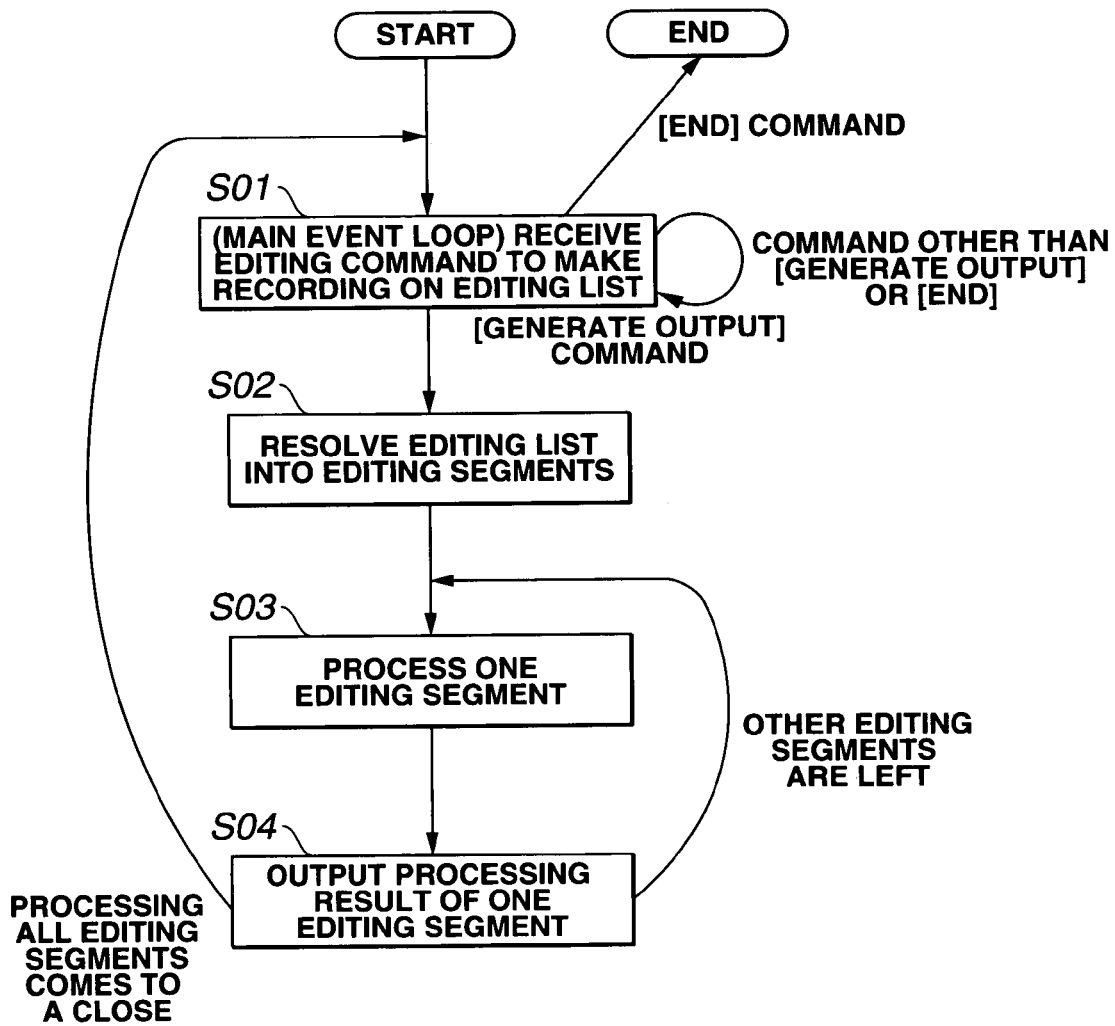
FIG. 2 is a status transition diagram showing the sequence of the editing processing in the image editing device.

Referring to FIG. 2, an editing command is fed in the picture editing device by a GUI (graphical user interface) or on batch processing at status S01. The input editing command is recorded on the editing list.

An ordinary editing command is that for importing an input file and performing picture processing on the imported input files. Specifically, the editing command may be exemplified by one designating the beginning and end points in a cut, superposing titles or other pictures, and specifying transitions, such as wipe and dissolve, between neighboring cuts.

The media file, furnishing the standard operation for picture data, is specified using a file dialog furnished by an operating system. The editing operations, such as copying, cutting, deletion, movement or clipping of multi-media data, such as picture data, is specified by the user with the aid of a mouse and the menu command on the graphical user interface.

When a command [generate an output] is issued, an editing list is produced. Although a list may be prepared at this time, it is possible to prepare a dynamic list during the time the command is received (event loop).

The editing list is made up of several tracks, each of which has a list of clips and track types, such as image, speech or effect. The clip includes image data, speech data or the effect data and the information on the beginning and end time points.

As a specified example of the editing list, one corresponding to two image tracks and one effect track is explained with reference to FIG. 3. This editing list has been stated as a class employing C++. However, the editing list and the associated configuration can also be represented by a variety of other equivalent methods.

Referring to FIG. 3A, the class editing list (Editlist) includes startTime, as beginning frame in absolute time, duration, as frame-based all-video period, aClipCount, as number of clips in track A, aSources, as clip data in each clip of the track A, bClipCount, as number of clips in track B, bSources, as clip data in each clip of the track B, effectCount, as number of effects in an effect track, and effects, as effect data.

Referring to FIG. 3B, the class AV clip (AVclip) includes startTime, as beginning time in an absolute frame, duration, as number of frames of this clip, filename, as filename of this input stream, and frameOffset, as file beginning frame.

Referring to FIG. 3C, the class effect (Effect) includes startTime, as beginning time in an absolute frame, duration, as number of frames of this effect, effectType, representing the type of the effect of the standard format, such as wipe, and effetParams, as a variety of effect parameters, such as start %, end % or orientations.

Since the editing list shows the relation between plural tracks, it may be graphically represented along time axis. FIG. 4 shows a specified example corresponding to two image tracks and one effect track, as described above.

In FIGS. 4A, 4B, 4C and 4D, a first picture track, an effect track, a second picture track and the time axis are shown, respectively.

In the sole picture track in FIG. 4A, a first video clip a is arrayed during a period from time point t0 until time point t3.

In the effect track of FIG. 4B, a title mask b1 is arranged since time point t0 until time point t1, whilst a wipe transition b2 is arrayed during a time period since time point t2 until time point t3.

In the second picture track in FIG. 4C, a second video clip c is arrayed during a period from time point t2 until time point 4.

In FIG. 4D, the time axis, represented by time points t0, t1, t2, t3 and t4, is displayed in the chronological order.

In this graphical representation, the video clip a contained in the first picture track, and the video clip c, contained in the second picture track, are interconnected to generate an image output. That is, a wipe transition b2 is inserted in an overlapping portion of the end of the video clip a in the first video clip with a beginning portion of the video clip c in the second picture track.

In the beginning part of the video clip a, there is obtained a picture output with the title mask b1 superposed thereon.

In the state S02, the processing of separating the editing list from the status S01 into editing segments is performed.

The recorded editing list is made up of plural tracks extending in the time axis direction, as discussed above. In this editing list, the entire editing track is split into plural portions, that is editing segments, along the time axis. Therefore, the editing list can be split into plural editing segments in the time axis direction.

The editing segment is defined as being the longest portions in which the respective effect tracks and respective picture tracks making up an editing list assume sole values. Therefore, the editing list, shown in the graphic representation of FIG. 4, is split into four editing segments.

The editing segments, thus split, are a first editing segment as from time point t0 up to time point t1, a second editing segment as from time point t1 up to time point t2, a third editing segment as from time point t2 up to time point t3, and a fourth editing segment as from time point t3 up to time point t4.

It should be noted that an optional track data or the totality of the track data as well as the effect track data may become void (φ) on the editing segment basis.

If the typical graphic representation of the editing list, shown in FIG. 4, is split into the editing segments, the result is shown as in FIG. 5.

That is, the first editing segment (edit segment 1), shown in FIG. 5A, corresponds to a time period since time point t0 up to time point t1, and is start (Start) t0, time period (Duration) t1–t0, first video (Video 1) a, second video (Video 2) φ and an effect (Effect) b1, where φ denotes [void] where there is no subject.

The second editing segment (edit segment 2), shown in FIG. 5B, corresponds to a time period since time point t1 up to time point t2, and is start t1, time period t2–t1, first video a, second video c and an effect φ.

The third editing segment (edit segment 3), shown in FIG. 5C, corresponds to a time period since time point t2 up to time point t3, and is start t2, time period t3–t2, first video a, second video c and an effect b2.

The fourth editing segment (edit segment 4), shown in FIG. 5D, corresponds to a time period since time point t3 up to time point t4, and is start t3, time period t4–t3, first video a, second video c and an effect φ.

If an editing segment is once constructed, it is possible to start generating a video output.

In the present embodiment, the generation of a video output in the processing in the state S03 is performed in association with formats or format classes. This method is now explained with reference to FIG. 6.

Figure 6:
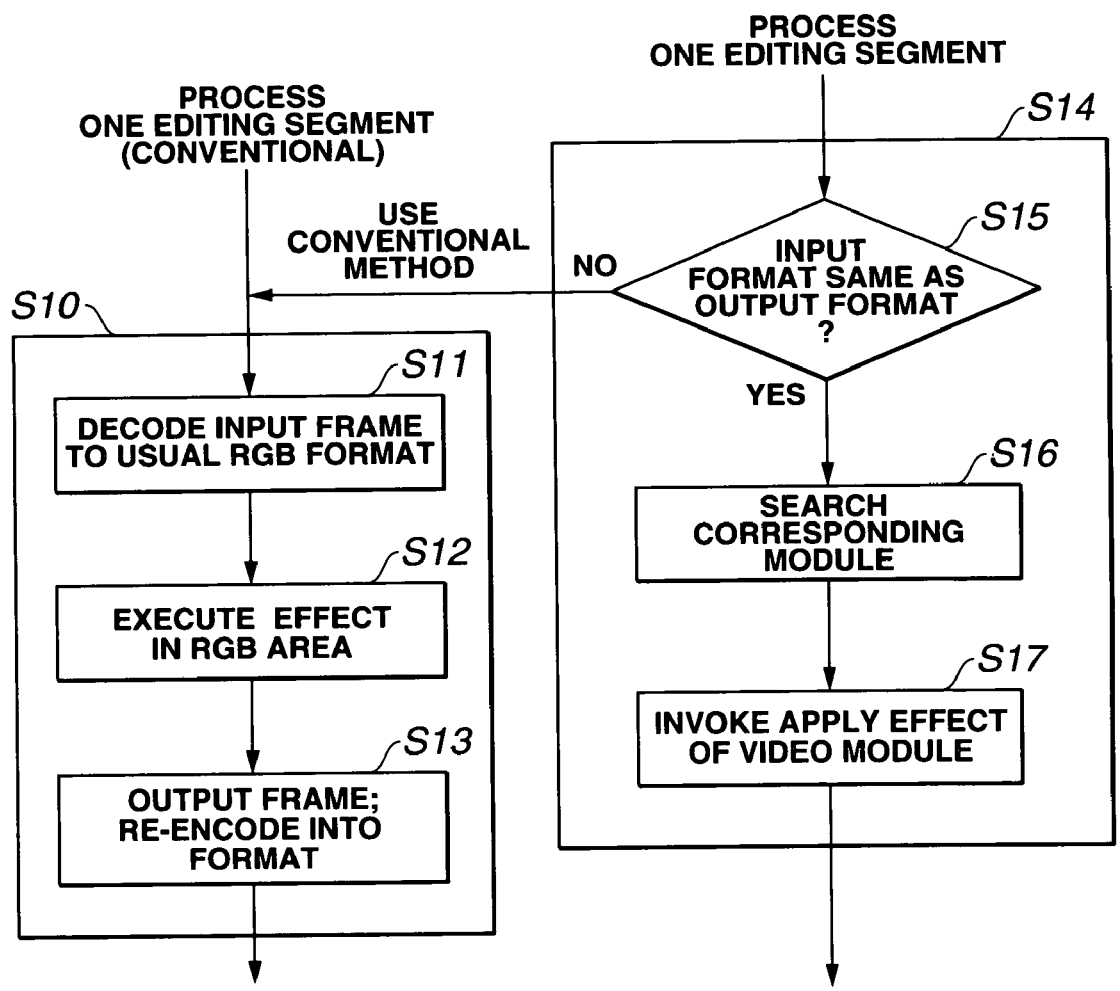
FIG. 6 is a flowchart showing the processing of an editing segment.

S14 on the right side of FIG. 6 is an editing method in which a video output is generated in an associated format. The left side of FIG. 6 is a conventional method in which a video output is issued after decoding into baseband signals such as the RGB signals composed of three prime color signals or YCrCb signals made up of luminance signals and two chrominance signals.

At step S14, it is verified whether or not an input format is the same as the output format. If it is verified that the input format is the same as the output format, the program moves to step S16 and, if otherwise, the program moves to step S10 for the conventional method.

At step S16, where the output format is the same as the input format, the picture editing device searches a video module corresponding to the format to deliver the effect processing to the video module.

The searching for a corresponding video module is usually a simple operation. Specifically, this operation is realized by repeating the operations of searching a list of the totality of the video modules and comparing the format code of the video module to a standard video format or a compressed format furnished by the operating system and which is embedded in the video format.

At step S17, an ApplyEffect, as function of applying the effect in the video module, is invoked.

The video module is a dynamically loaded library having a standard API (application program interface) for picture processing. FIG. 7 shows an interface of a class (class) of a video module (VideoModule).

This video module includes a format (format), as a standard format specifier, a class (class) as a standard class identifier, a ConvertToBaseband, for decoding a frame into RGB, a ConvertToClass for decoding a frame into a format, such as to a DCT level, and an ApplyEffect for applying the transition effect using the knowledge of this format.

In the present embodiment, the format is an integer representing an opened standard format such as so-called DV or MPEG-2. The class indicates the group of the format to which belongs the video module. For example, both the DV and the motion JPEG belong to the class [video format based on DCT for only an I-frame]. A video format in a given class can be converted to an intermediate form. This intermediate form is more desirable than the uncompressed format with respect to the speed, space and/or quality. Therefore, both the DV and the motion JPEG can be transformed into formats made up of non-quantized DCT coefficients.

Up to now, for editing segments not having the effect, the picture editing device performs copying in the compressed area of the totality of frames of the frame-based video format. On the other hand, for editing segments having the effect, the effect is applied to the pixel area by compounding the respective frames in the segment to the pixel area. This processing is continued for the respective editing segments until completion of the entire video output.

In the conventional method, an output picture is generated at step S10.

At step S10, an input frame is decoded to an ordinary RGB format. At step S12, the effect is executed in the RGB area and, at step S13, the frame is re-encoded into an output format.

In the editing device, decoding of each frame to a baseband is by a coder/decoder (codec).

Figure 8:
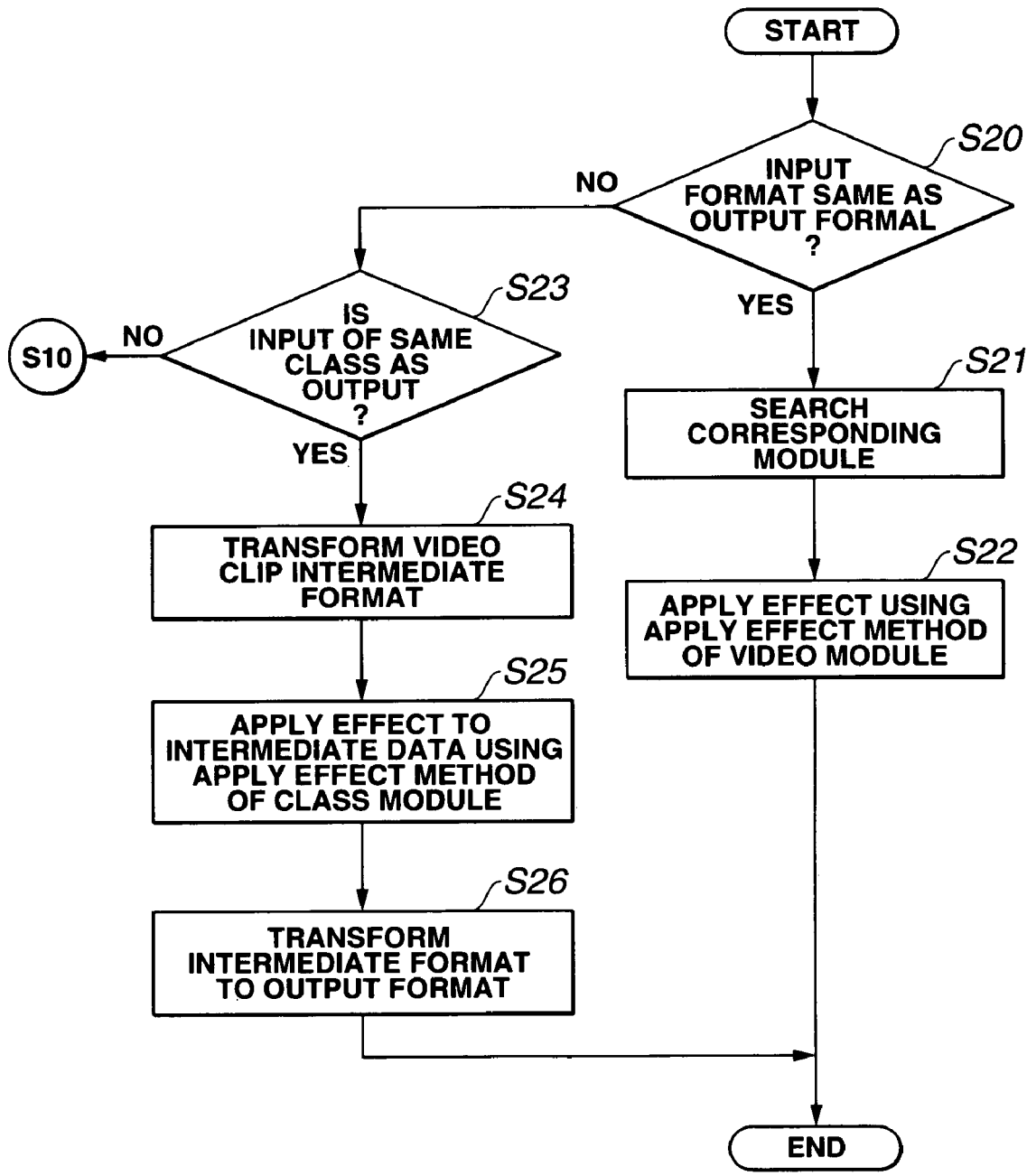
FIG. 8 is a flowchart for illustrating the processing of a glass video module.

The method for generating a video output in association with the format can be extended to generation of a video output in association with the format class. The processing of an editing segment employing a format class is as shown in FIG. 8.

At step S20, the input format is compared to a desired output format. If these are equal to each other, the program moves to step S21 and, if otherwise, the program moves to step S23.

If the input format is equal to the output format, processing is continued by a method described in connection with steps S16 and S17 in FIG. 6. That is, a corresponding video module is searched at step S21 as at step S16. At step S22, the effect is applied using the ApplyEffect of the video module, as at step S17.

At step S23, the input class is compared to the output class. If the classes also are different, processing transfers to a conventional method of effecting the combination of the input frame in the pixel area, using the baseband signals, as explained above in connection with step S10 shown in FIG. 6.

If the classes are equal, the program moves to step S24 to transform the input into an intermediate form.

The format class indicates the group of the format to which belongs the video module, as discussed above. For example, both the V and the JPEG belong to the class of the [video format which is based on DCT only of the I-frame].

The picture data, having the same format class in common, is transformed into an intermediate form which is the common format.

At step S25, the processing is applied by an ApplyEffect of the video module (VideoModule) on this intermediate form. Finally, the result of step S25 is converted at step S26 from the intermediate form to the output format.

Figures 9, 10:
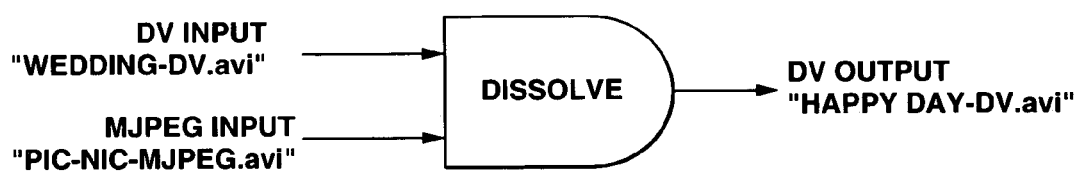
FIG. 9 shows an editing segment composed of two input files having different formats.
FIG. 10 shows an example of processing an editing segment employing input video belonging to the same class but having different formats.
Figure 11:
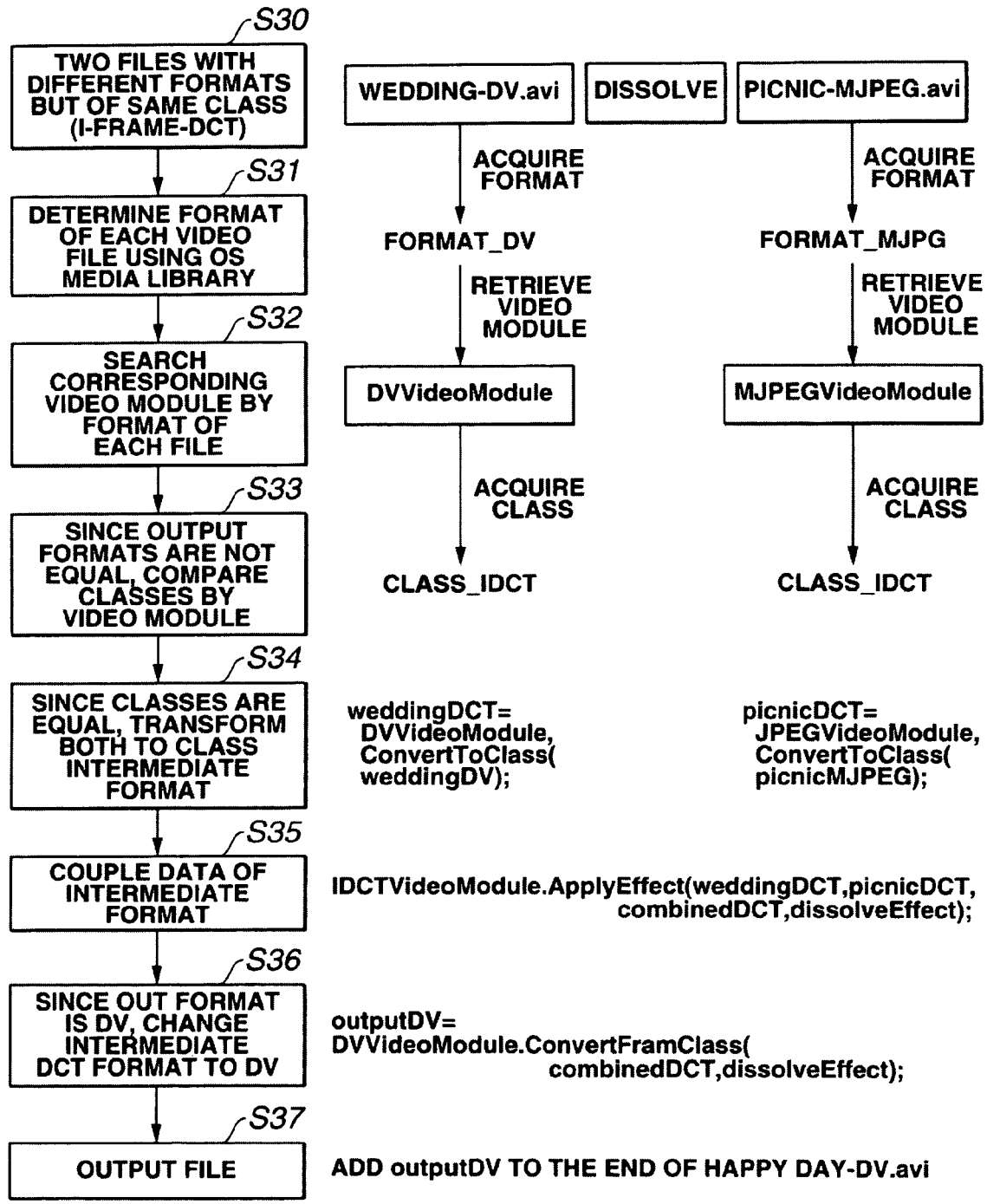
FIG. 11 shows the definition of the format and the class.

Referring to FIGS. 9 to 11, a more specified example of the picture editing processing is explained.

Assume that two input files of different formats are coupled using a dissolve transition and are output as a so-called DV file.

A first input [wedding-DV.avi] is a so-called DV format, whilst the second input [picnic-MPEG.avi] is a so-called motion JPEG format. A [happy day-DV.avi] is output by the so-called DV format which is a combination of the two formats.

FIG. 10 simply enumerates several convenient constants for discriminating the classes of the so-called DV, so-called MPEG format and the DCT format only of the I-frame which is the class of the common format.

These constants are defined by FourCC (a, b, c, d) as logical sum of a first number a, shifted by 24 bits, a second number b, shifted by 16 bits, a third number c, shifted by 8 bits, and a fourth number d.

That is, the FORMAT_DV, FORMAT_MJPEG and the FORMAT_IDCT are defined as FourCC('D', 'V', 'C', 'S'), FourCC('M', 'J', 'P', 'G') and as FourCC('I', 'D', 'C', 'T'), respectively.

The combination of the input files, shown in FIG. 9, employing the above-described format class, is explained with reference to FIG. 11.

At step S30, two files [wedding-DV.avi] and [picnic-MPEG.avi], which are of different formats but of the same class (I-frame DCT) are given. These files are coupled by the dissolve transition in accordance with the following steps:

At step S31, the formats of the two input files are set. The format is determined using a media library of an operating system. So, the formats [wedding-DV.avi] and [picnic-MPEG.avi] are determined to be [FORMAT-DV] and [FORMAT-MJPEG], respectively.

Since these two formats are not equal, the program moves to step S32 to search a video module for each format. As a result of video module searching, the video modules for [wedding-DV.avi] and [picnic-MJPEG.avi] are [DVVideoModule] and [MJPEGVideoModule], respectively.

Since the formats are not equal at step S33, the video modules are referenced as to the format classes, which are then compared to each other. That is, the classes are acquired from class modules [DVVideoModule] and [MJPEGVideoModule], corresponding to the [wedding-DV.avi] and [picnic-MJPEG.avi], respectively. The so-acquired classes are both [CLASS_IDCT].

At step S34, the classes acquired at step S33 are equal. So, the ConvertToClass ( ) is invoked on the input module to convert the respective input classes to a common class format.

At step S35, the IDCTVideoModule couples the as-converted DCT format data using a dissolve effect.

At step S36, the intermediate form is converted into the output format (DV).

Finally, at step S37, the editing segment is output to the target file. This processing is similar to the method of decoding the video into pixel formats before the conventional video picture editing device executes the effect.

There is, however, a difference that, in the present invention, the frame is decoded only partially. This partial decoding can usually be performed more quickly than complete software decoding to permit the format module class to utilize the optimizing class proper to the format, as described above.

So, in the present embodiment, employing a video module, the knowledge proper to the format can be capsulated to execute an editing operation optimized with respect to the speed and/or the picture quality.

In the present embodiment, the video module is realized as a dynamically linked library arranged in a specified directory of the hardware disc.

The picture editing device includes means for accessing and updating plural video modules. The video module can be dynamically updated during a sole editing session or during the editing session. That is, the format that can be utilized by the picture editing device is automatically updated by addition, deletion or substitution.

The processing of the effect of employing the video on the basis of the DCT is explained. By employing the video module, the present embodiment effectively supports an optional number of compression formats. The advantages of the digital video compression based on the DCT is hereinafter explained.

The DCT-based video compression method splits each frame into pixel blocks of regular size, oftentimes 8×8 pixel blocks. These blocks are constructed into a macroblock by pixel components, such as Y, Cr and Cb. Two examples of the macro-blocks are shown in FIG. 12.

Referring to FIG. 2, a 4:1:1 macro-block 22 and a 4:2:2 macro-block 23 are each constituted by six blocks, each block being made up of 8×8 pixels as a unit.

That is, the 4:1:1 macro-block 22 is made up of four Y-blocks 22a, a Cr block 22b and a Cb block 22c. The 4:2:0 macro-block 23 is made up of four Y-blocks 23a, a Cr block 23b and a Cb block 23c. In this manner, the Y-blocks and the Cr and Cb blocks are superposed together to constitute a macro-block.

Figure 12:
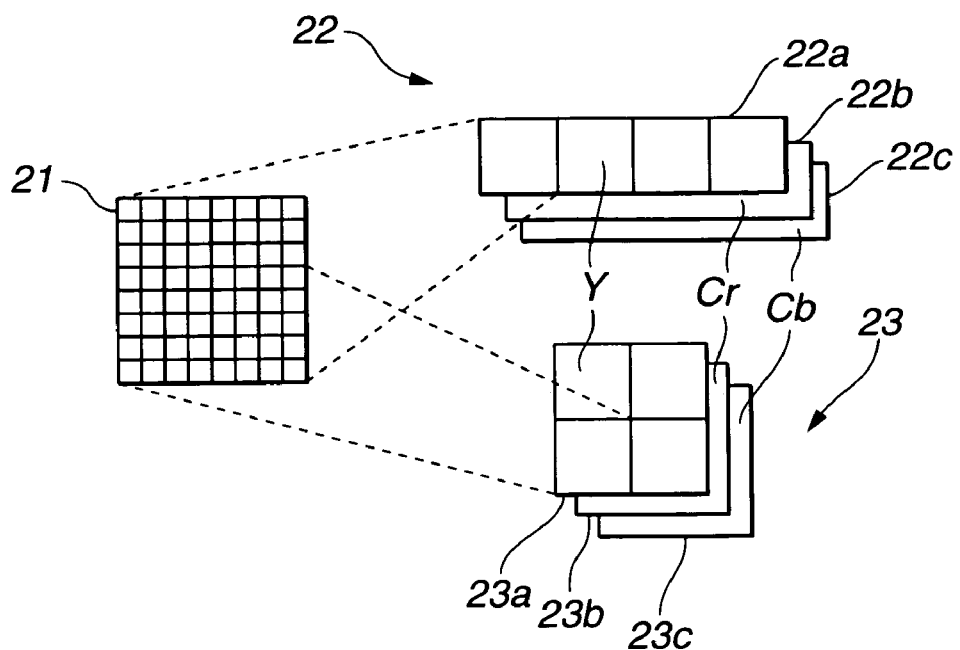
FIG. 12 shows a structure of a typical macro-block.

Although two exemplary macro-block structures are shown in FIG. 12, a number of similar macro-block structures are usually employed.

Figure 13:
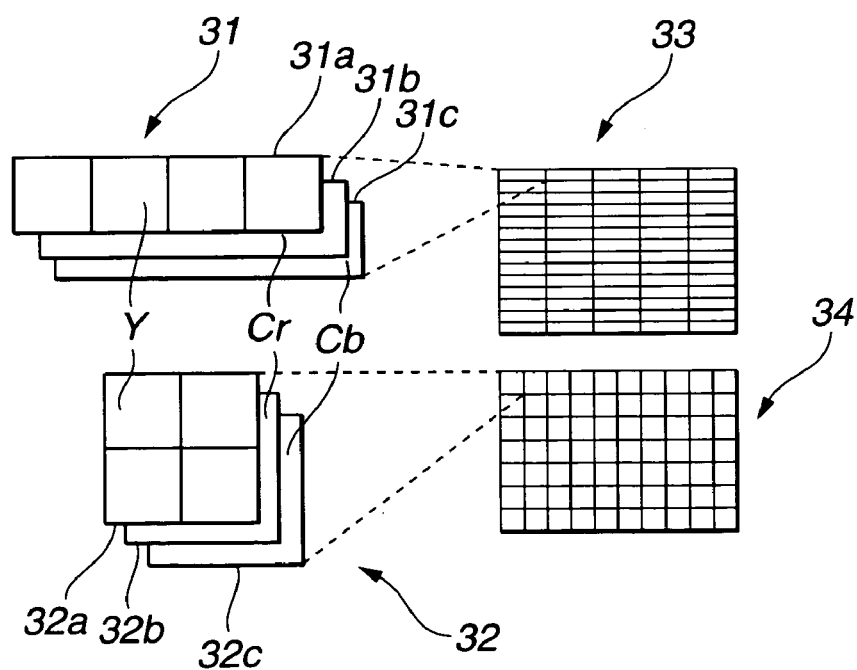
FIG. 13 shows an arrangement of a macro-block on a screen.

FIG. 13 shows two examples of splitting a video frame into macro-blocks.

That is, in FIG. 13, a video frame 33 is made up of 14 vertical×5 horizontal 4:2:2 macro-blocks 31. The 4:2:2 macro-block 31 is made up of four Y-blocks 31a, corresponding to Y-signals, a fifth block 31b, corresponding to the CR signal, and a sixth block 31c, corresponding to the Cb signal.

A video frame 34 is made up of 7 vertical×10 horizontal 4:2:0 macro-blocks 32. The 4:2:0 macro-block 32 is made up of four Y-blocks 32a, corresponding to Y-signals, a fifth block 32b, corresponding to the CR signal, and a sixth block 32c, corresponding to the Cb signal.

As an example of transition, wipe transition is explained with reference to FIG. 14.

Figure 14:
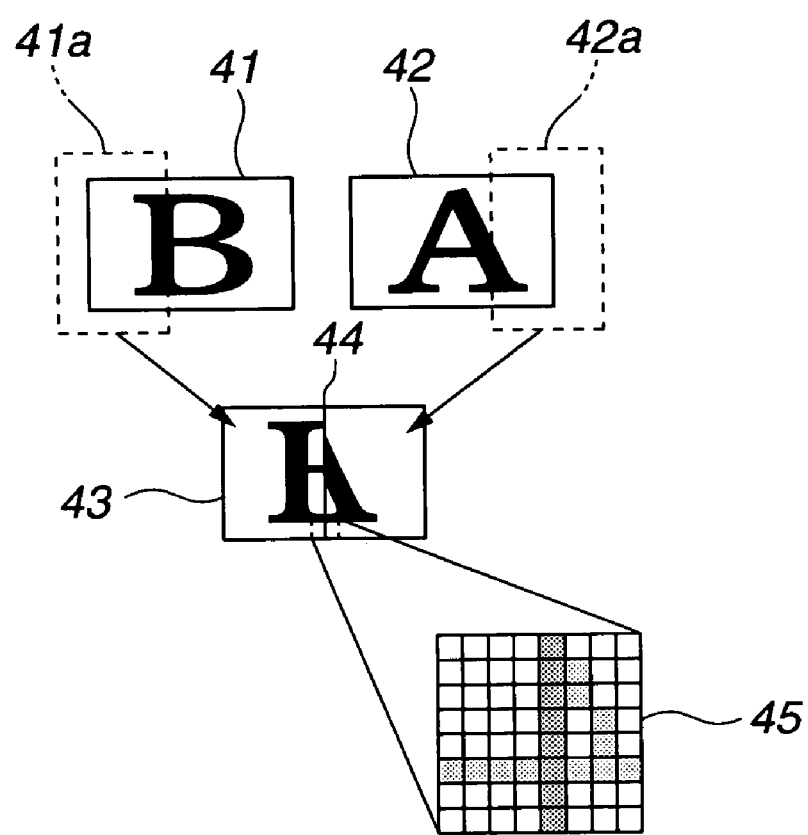
FIG. 14 shows a wipe transition having its major portion constituted by macro-block duplication.

In the wipe transition, shown in FIG. 14, one of a first input frame 41 demonstrating a letter B and a second input frame 42 demonstrating a letter A is erased in a wiping-off manner and the other of the first input frame 41 and the second input frame 42 is displayed as an output frame 43.

In the output frame 43, a portion 41a of the first input frame 41 and a portion 42b of the second input frame 42 are displayed.

A macro-block 45, lying along a transition edge 44 of the output frame, is made up of a first input frame 41 and a second input frame 42. These two inputs are coupled together in a frequency range, if this is possible. If such combination in the frequency range is not possible, only a necessary number of blocks are coupled together in the pixel domain.

The macro-blocks not astride the wipe position can be processed by copying in the frequency domain. The macro-blocks astride the wipe position can frequently be processed in the frequency domain, as will be explained subsequently.

More complicated effects accompanying non-macro-block local effect, such as the three-dimensional effect or deformation (warping), are difficult to achieve in the frequency domain. So, these effects are handled by the conventional method (baseband).

In many cases, the wipe transition can be executed by copying a compressed macro-block from an input frame. A small number of macro-blocks, astride the transition edge, are generated by partially decoding suitable blocks of the input frame to the DCT coefficient level, combing them using a pre-calculated wipe matrix and re-compressing the blocks to an ultimate bitstream. In certain cases, the blocks coupled to the copied block are not represented by a number of bits not larger than the allowed number of bits, and hence re-quantization is executed.

Other [local] effects, such as iris or bit mask overlay effect, can be executed by a similar method, by direct copying of the majority of macro-blocks from a source and by applying a DCT domain processing technique to the remaining macro-blocks.

The cross-resolve cannot be achieved by copying the input macro-blocks because it is a linear combination of the totality of input macro-blocks. However, the characteristics proper to DCT can be easily calculated using a combination in which the cross-dissolve is weighted by the DCT coefficients.

An output DCT coefficient $c_{i,j}$ may be calculated by $$c_{i,j}=\alpha \times a_{i,j}+(1-\alpha) \times b_{i,j}$$

where $c_{i,j}$ is a non-quantized output coefficient of a row i and a column j of DCT, $a_{ij}$ is a non-quantized coefficient of an input A of a row i and a column j of DCT, $b_{i,j}$ is a coefficient of an input B of a row i and a column j of DCT and $\alpha$ is a proportion of the dissolve to which is subjected an input A, with $0 \leq \alpha \leq 1.0$.

As an excellent thesis in the processing technique in the DCT domain, there is a thesis for doctorate for technical engineering by Shih-Fu Chang entitled "Compositing and manipulation of Video Signals for Multimedia Network Video Services", which appeared in a Journal "Electrotechnical and Computer Science", 1993, by Barclay school of California University, USA.

Meanwhile, the present invention may be implemented as a program stored in a hard disc 6 of the editing device, and uses a media file stored in the hard disc 6. The present invention also encompasses the use of plural hard discs or other media for storage.

In the hard disc shown in FIG. 1, there is recorded a program for executing the above-described picture editing. This program is read into the memory 4 and executed on an operating system to realize the above-described editing in the picture editing device.

This program manages control to specify the form of an input video signal, receive an editing operation for the input video signal, edit the input video signal in accordance with the input editing operation, convert the edited input video signal into an output stream, and to edit the input video signal in meeting with the format responsive to the format or format class of specified input video signal. The input video signal may also be converted into intermediate form signals.

Although the DV or the motion JPEG and the I-frame are given above as the format and as the format class, respectively, the present invention is not limited thereto, such that it is of course possible to apply other suitable formats or format classes.

What is claimed is:

1. A signal processing apparatus comprising:
   form specifying means for specifying the forms of input video signals;
   inputting means fed with an editing operation for said input video signals,
      wherein the inputting means is adapted assign a module for each form and to identify a common class based on the assignment;
   a plurality of editing processing means, associated with said forms, said editing processing means editing said input video signals in accordance with an editing operation fed as an input to said inputting means and the common class;
   converting means for converting said input video signals, edited by said editing processing means, into an output stream; and
   control means for managing control to edit the input video signals by said editing processing means associated with said forms in accordance with the forms of said input video signals specified by said form specifying means.

2. The signal processing apparatus according to claim 1 wherein said editing operations include cutting, copying, pasting, re-sizing, temporal movement, superposition of images or texts and transition.

3. The signal processing apparatus according to claim 1 further comprising:
   editing processing management means for replacing, deleting or substituting editing operations for particular forms in said editing processing means.

4. The signal processing apparatus according to claim 1 further comprising:
   format converting means for converting said input video signals into signals of a common format, said editing processing means executing editing processing on video signals converted by said format converting means into signals of the common format.

5. A signal processing method comprising:
   specifying the form of input video signals;
   receiving an editing operation for said input video signals;
   assigning a module for each form;
   identifying a common class based on the assigning step;
   editing said input video signals in accordance with an input editing operation and the common class;
   converting the edited input video signals into an output stream; and
   managing control to edit said input video signals associated with said forms depending on the form of said input video signals as specified.

6. The signal processing method according to claim 5 wherein said input video signals are converted into signals of the common format.

7. A recording medium having a program for processing video signals recorded thereon, said program comprising:
   specifying the from of input video signals;
   receiving an editing operation for said input video signals;
   assigning a module for each form;
   identifying a common class based on the assigning step;
   editing said input video signals in accordance with an input editing operation and the common class;
   converting the edited input video signals into an output stream; and
   managing control to edit said input video signals associated with said forms depending on the form of said input video signals as specified.

8. The recording medium according to claim 7 wherein said input video signals are converted into signals of the common format.

* * * * *